United States Patent
Kamen et al.

[11] Patent Number: 5,975,225
[45] Date of Patent: Nov. 2, 1999

[54] TRANSPORTATION VEHICLES WITH STABILITY ENHANCEMENT USING CG MODIFICATION

[75] Inventors: Dean L. Kamen, Bedford; Robert R. Ambrogi, Manchester; Richard Kurt Heinzmann, Francestown, all of N.H.

[73] Assignee: DEKA Products Limited Partnership, Manchester, N.H.

[21] Appl. No.: 08/479,901

[22] Filed: Jun. 7, 1995

Related U.S. Application Data

[63] Continuation-in-part of application No. 08/384,705, Feb. 3, 1995, which is a continuation-in-part of application No. 08/250,693, May 27, 1994, Pat. No. 5,701,965, which is a continuation-in-part of application No. 08/021,789, Feb. 24, 1993, abandoned.

[51] Int. Cl.$^6$ .................................................. B62D 61/12
[52] U.S. Cl. .............................. 180/7.1; 180/8.2; 180/21; 180/65.8; 180/907; 280/5.26; 701/124
[58] Field of Search ..................................... 280/5.2, 5.26, 280/5.28, 5.32, 78, 208, 209, DIG. 10; 180/7.1, 8.1, 8.2, 8.3, 8.5, 8.7, 21, 209, 65.1, 901, 907

[56] References Cited

U.S. PATENT DOCUMENTS

| | | | |
|---|---|---|---|
| 3,288,234 | 11/1966 | Feliz | 280/DIG. 10 |
| 4,709,772 | 12/1987 | Brunet | 280/5.26 |
| 4,790,548 | 12/1988 | Decelles et al. | 280/5.26 |
| 4,794,999 | 1/1989 | Hester | 280/5.26 |
| 5,248,007 | 9/1993 | Watkins et al. | 280/DIG. 10 |

FOREIGN PATENT DOCUMENTS

| | | | |
|---|---|---|---|
| 0980237 | 5/1951 | France | 280/DIG. 10 |
| 0044933 | 4/1977 | Japan | 280/DIG. 10 |
| 0087766 | 6/1982 | Japan | 280/78 |
| 0305082 | 12/1988 | Japan | 180/209 |
| 2139576 | 11/1984 | United Kingdom | 280/DIG. 10 |

*Primary Examiner*—Anne Marie Boehler
*Attorney, Agent, or Firm*—Bromberg & Sunstein LLP

[57] ABSTRACT

There is provided, in a preferred embodiment, a vehicle for transporting a payload (which may but need not include a human subject) over ground having a surface that may be irregular. This embodiment has a support for supporting the payload. A ground-contacting module, movably attached to the support, serves to suspend the payload in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the payload over the surface. A CG modifying arrangement is provided for actively modifying the location of the center of gravity of the assembly. Finally, the embodiment has a CG control loop, in which the CG modifying arrangement is included, for dynamically enhancing stability of the vehicle by operation of the CG modifying means based on at least one of motion or orientation of the vehicle.

4 Claims, 12 Drawing Sheets

TRANSPORTATION VEHICLES WITH STABILITY ENHANCEMENT USING CG MODIFICATION

This application is a continuation in part of U.S. application Ser. No. 08/384,705, filed Feb. 3, 1995, which is a continuation in part of U.S. application Ser. No. 08/250,693, filed May 27, 1994, now U.S. Pat. No. 5,701,965 which in turn is a continuation in part of now abandoned U.S. application Ser. No. 08/021,789, filed Feb. 24, 1993 now abandoned. These related applications are hereby incorporated herein by reference.

TECHNICAL FIELD

The present invention pertains to vehicles and methods for transporting individuals, and more particularly to vehicles and methods for transporting individuals over ground having a surface that may be irregular.

BACKGROUND ART

A wide range of vehicles and methods are known for transporting human subjects. The design of these vehicles has generally resulted from a compromise that favors stability over maneuverability. It becomes difficult, for example, to provide a self-propelled user-guidable vehicle for transporting persons over ground having a surface that may be irregular, while still permitting convenient locomotion over ground having a surface that is relatively flat. Vehicles that achieve locomotion over irregular surfaces tend to be complex, heavy, and difficult for ordinary locomotion.

SUMMARY OF THE INVENTION

The invention provides, in a preferred embodiment, a vehicle for transporting a payload (which may but need not include a human subject) over ground having a surface that may be irregular. This embodiment has a support for supporting the payload. A ground-contacting module, movably attached to the support, serves to suspend the payload in the support over the surface. The orientation of the ground-contacting module defines fore-aft and lateral planes intersecting one another at a vertical. The support and the ground-contacting module are components of an assembly. A motorized drive, mounted to the assembly and coupled to the ground-contacting module, causes locomotion of the assembly and the payload over the surface. A CG modifying arrangement is provided for actively modifying the location of the center of gravity of the assembly with payload. Finally, the embodiment has a CG control loop, in which the CG modifying arrangement is included, for dynamically enhancing stability of the vehicle by operation of the CG modifying means based on at least one of motion or orientation of the vehicle.

In a further embodiment, the ground-contacting module is movably linked to the support and the CG modifying arrangement includes an arrangement for moving the ground-contacting module in relation to the support. The ground contacting module may be realized as a pair of ground-contacting members, laterally disposed with respect to one another. Each ground-contacting member may in turn be realized as a cluster of wheels. The wheels in each cluster are motor-driven independently of the cluster. In a further embodiment, each cluster has two wheels; alternatively, each cluster may have three wheels.

The assembly may include an articulated arm having a plurality of segments linking the support to the ground-contacting module, and the angle between adjacent segments of the arm in this embodiment is adjustable. Because the approach of the present invention involves changing the mechanical configuration of the vehicle above the point of contact with the ground, it does not depend on traction for its success, and may be employed even where traction is limited or non-existent, as on ice.

BRIEF DESCRIPTION OF THE DRAWINGS

The invention will be more readily understood by reference to the following description, taken with the accompanying drawings, in which:

FIGS. 8 and 9 illustrate the control arrangement for stair-climbing and obstacle traversal achieved by the cluster design of a preferred embodiment of the present invention;

DETAILED DESCRIPTION OF SPECIFIC EMBODIMENTS

The invention may be implemented in a wide range of embodiments. A characteristic of many of these embodiments is the use of a pair of laterally disposed ground-contacting members to suspend a subject (or other payload) over the surface with respect to which the subject is being transported. The ground-contacting members are motor-driven. In some embodiments, the configuration in which the subject is suspended during locomotion lacks inherent stability at least a portion of the time with respect to a vertical in the fore-aft plane but is relatively stable with respect to a vertical in the lateral plane. Fore-aft stability in such embodiments is achieved by providing a control loop, in which the motor is included, for operation of the motor in connection with the ground-contacting members. As described below, the pair of ground-contacting members may, for example, be a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain the center of mass of the vehicle above the point of contact of the ground-contacting members with the ground, regardless of disturbances and forces operative on the vehicle.

Figure 1:
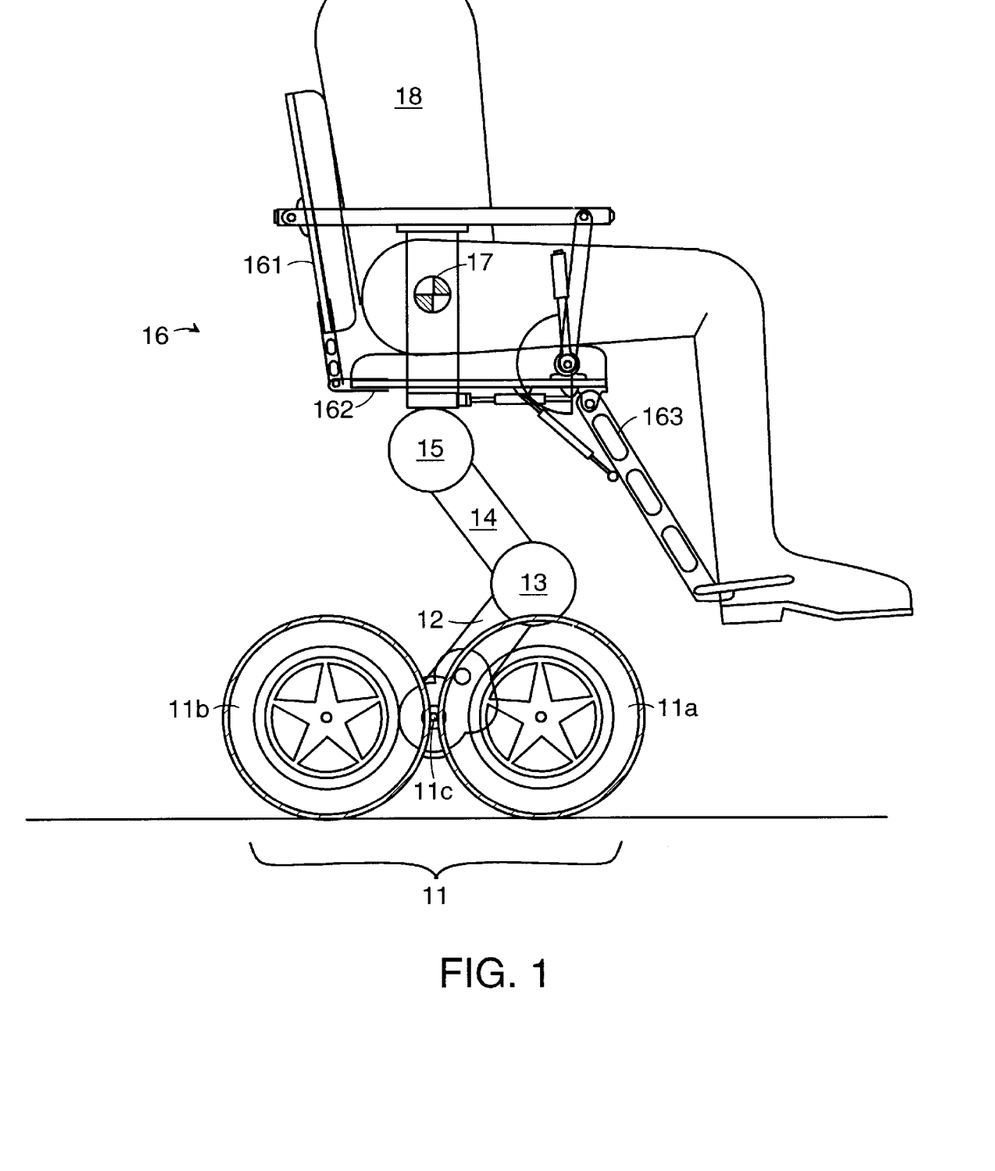
FIG. 1 is a side elevation of a preferred embodiment of the present invention, showing a subject seated thereon.

In FIG. 1 is shown a preferred embodiment of the invention in which the ground-contacting members are a pair of wheel clusters. The embodiment shown in FIG. 1 includes a support arrangement 16, embodied here as a chair, on which a subject 18 may be seated. The vehicle is provided with a pair of wheel clusters (the right cluster of which is shown as item 11) disposed laterally with respect to one another. The clusters help to define a series of axes including a vertical axis (here oriented along the long direction of the page in which FIG. 1 is printed), a lateral axis parallel to the axis of the wheels (that is, oriented perpendicular to the plane of the page in which FIG. 1 is printed), and a fore-aft axis perpendicular to the wheel axis (that is, oriented along the short direction of the page in which FIG. 1 is printed). The plane defined by the vertical axis and the lateral axis (which is therefore perpendicular to the plane of the page in which FIG. 1 is printed) will sometimes be referred to as the "lateral plane", and the plane defined by the fore-aft axis and the vertical axis (which is therefore parallel to the plane of the page in which FIG. 1 is printed) will sometimes be referred to as the "fore-aft plane".

In FIG. 1, the embodiment utilizes a two-wheel cluster design, but other numbers of wheels may be employed in each cluster, for example three wheels, as illustrated schematically in FIGS. 6 and 7 described below. In view in FIG. 1 is the right-hand cluster 11 with a pair of wheels 11a and 11b in radially symmetric locations about the cluster's axis 11c of rotation. A similar left-hand cluster is also employed. Each cluster has its own separately controlled motor to drive it about its axis of rotation 11c. Each pair of wheels (here, 11a and 11b) is also driven by a separately controlled motor to rotate about their respective axes of rotation, but the wheels of a cluster are coupled to rotate synchronously.

It should be noted that although many of the embodiments described herein utilize separate motors individually controlled, a common motor may be used for a number of functions, and the separate control may be achieved by appropriate clutch or other power transmission arrangement, such as a differential drive. The term "motorized drive" as used in this description and the following claims means any vehicle that produces mechanical power regardless of means, and therefore includes a motor that is electric, hydraulic, pneumatic, or thermodynamic (the latter including an internal combustion or an external combustion engine) together with any appropriate arrangement for transmission of such mechanical power; or a thrust-producing device such as a turbojet engine or a motor-driven propeller.

Also as shown in FIG. 1, the chair 16 may be linked to the clusters via an articulated arm having segments 12 and 14 that may be adjusted in angle with respect to each other and the chair 16. The adjustments are achieved by motorized drives disposed at hubs 13 and 15. (Such drives may, for example, be harmonic drives.) As a result of these adjustments (in addition to the effect of rotating the clusters), the height of the chair 16, among other things, may be changed. As will be discussed in further detail below, the foregoing adjustments also permit adjustment of the fore-aft tilt of the chair.) The chair 16 has a back 161, a seat 162, and leg support 163. The angle of back 131 relative to the seat 132, the angle of the seat 132 relative to the horizontal, and the angle of the leg support 163 relative to the seat may all be adjusted.

A manual interface, such as a joystick, is used to adjust the torques of motors driving the wheels. In operation of this embodiment, forward motions of the joystick is used to cause forward motion of the vehicle, and reverse motion of the joystick causes backward motion of the vehicle. A left turn similarly is accomplished by leftward motion of the joystick. For a right turn, the joystick is moved to the right.

It can be seen in FIG. 1 that the cluster 11 is positioned so that both wheels 11a and 11b may be in contact with the ground. When the cluster 11 (along with the left-hand cluster) is in this position, the vehicle of this embodiment is relatively stable in the fore-aft plane, thereby permitting a standing subject to assume rapidly a comfortable seated position on the vehicle or, for example, a handicapped person to transfer from another seat. After the subject is seated, the cluster 11 may be rotated about its axis 11c until only a single wheel of the cluster is in contact with the ground. When the cluster 11 (along with the left-hand cluster) is in this position, the vehicle has inherent fore-aft instability. Utilizing a feedback loop, however, in which the vehicle's orientation and motion are sensed or otherwise determined, the wheels may be driven to create fore-aft stability dynamically. In this mode of operation, which we called "balance mode" in previous applications, the vehicle's clusters are effectively locked in position, and balancing of the vehicle is achieved by appropriately driving the wheels, as described in previous applications.

In another mode of operation, which we called "lean mode" in previous applications, the cluster motors (that is, the motors determining the angular orientation of the clusters) are driven to maintain balance, and the wheel motors are slaved to turn at a specified rate in relation to the cluster motors. As disclosed in previous applications, the lean mode permits effective stair-climbing. As described herein, however, the lean mode may desirably be used generally in other circumstances to maintain stability when more than a single pair of laterally disposed wheels are in contact with the ground. Also as described herein, the lean mode may be viewed generally as a strategy to modify the location of the center of gravity (CG) 17 of the vehicle with payload dynamically in order to increase vehicular stability. Here the CG 17 is shown approximately centered between the front and rear wheels, a position that is typical when the vehicle is not experiencing acceleration.

In order to negotiate turning efficiently when four wheels are in contact with the ground, a vehicle in accordance with the embodiment of FIG. 1 may be operated in balance mode during the turn, with the clusters rotated only just enough to raise slightly, for example, the rear wheels. The front wheels may then be driven differentially, as described in previous applications, to achieve the turn, after which the clusters may be rotated again to place four wheels in contact with the ground. Alternatively, or in addition, to handle cases when four wheels are in contact with the ground, the vehicle may be provided with arrangements well known in the prior art for front and/or rear wheel steering and a suitable differential drive for those wheels that are motor driven. Of course, it is not necessary that all four wheels be driven if they are all in contact with the ground, and a pair of wheels could be configured to idle either by use of a suitable clutching arrangement, or by use of separately powered motors for each wheel of a cluster, or by simply not powering one of the wheels of each cluster.

It can be seen that the invention herein can be applied in a wide range of contexts distinct from those described in detail here. For example, some benefit could be obtained by operating the vehicle of FIG. 1 with the clusters locked and by operation only of the motorized drives at hubs 13 and 15 to shift dynamically the position of the support (here the chair 16) in relation to the ground-contacting module (here the cluster pair) in response to motion and/or position information. In other words, any arrangement that actively causes a shift in the center of gravity of the vehicle with payload and that is harnessed dynamically via a control loop in response to motion or position information to increase stability is within the scope of the present invention. For example, a four-wheeled truck having a movable load-carrying area that is actively shifted in relation to its wheels dynamically via a control loop in response to motion or position information so as to increase stability is within the scope of the present invention.

Because the approach of the present invention involves changing the mechanical configuration of the vehicle above the point of contact with the ground, it does not depend on traction for its success, and may be employed even where traction is limited or non-existent, as on ice. When the vehicle is supported by wheels or other facilities (such as arcuate members) contacting the ground in three or more distinct locations that collectively are not substantially co-linear, the vehicle may achieve vertical stability without recourse to horizontal forces exerted by the wheels (or other facilities) for balancing. Under these circumstances the shifting of the vehicle's CG may be employed to enhance stability, even when wheel traction is absent or not available.

Figure 2:
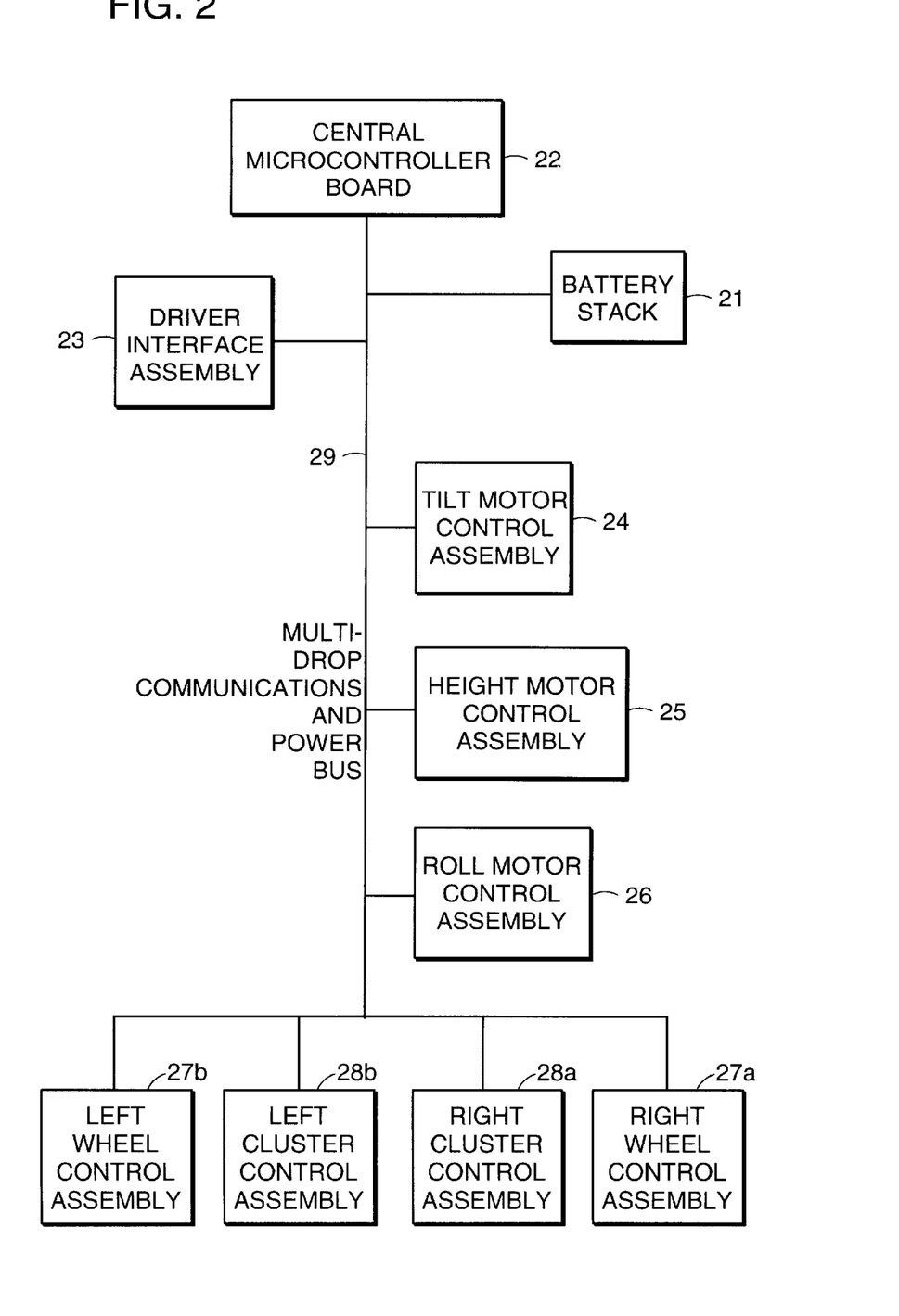
FIG. 2 is a block diagram showing communication among the control assemblies used in the embodiment of FIG. 1.

FIG. 2 is a block diagram showing communication among the control assemblies used in a vehicle according to the embodiment of FIG. 1. The vehicle is powered by battery stack 21. Bus 29 provides communications (here implemented serially) among and power to the various assemblies. Overall system control of the vehicle is provided by central micro controller board 22. Inputs, derived from sources such as the joystick and inclinometer, to the central micro controller board 22 that establish the basis for system control are provided by the driver interface assembly 23, which is described below in connection with FIG. 4. The tilt, height, and roll of the chair 16 of FIG. 1 are adjusted by tilt motor control assembly 24, height motor control assembly 25, and roll motor control assembly 26 respectively. Rotation of the right and left clusters is controlled by right cluster control assembly 28a and left cluster control assembly 28b respectively. Rotation of the wheels in the right cluster and in the left cluster is controlled by right wheel control assembly 27a and left wheel control assembly 27b. (Although the embodiment of FIG. 2 shows use of a single micro controller board 22, we have found it advantageous in some embodiments to utilize a number of microprocessors operating in parallel, as described in application Ser. No. 08/384,705, filed Feb. 3, 1995.)

Figure 3:
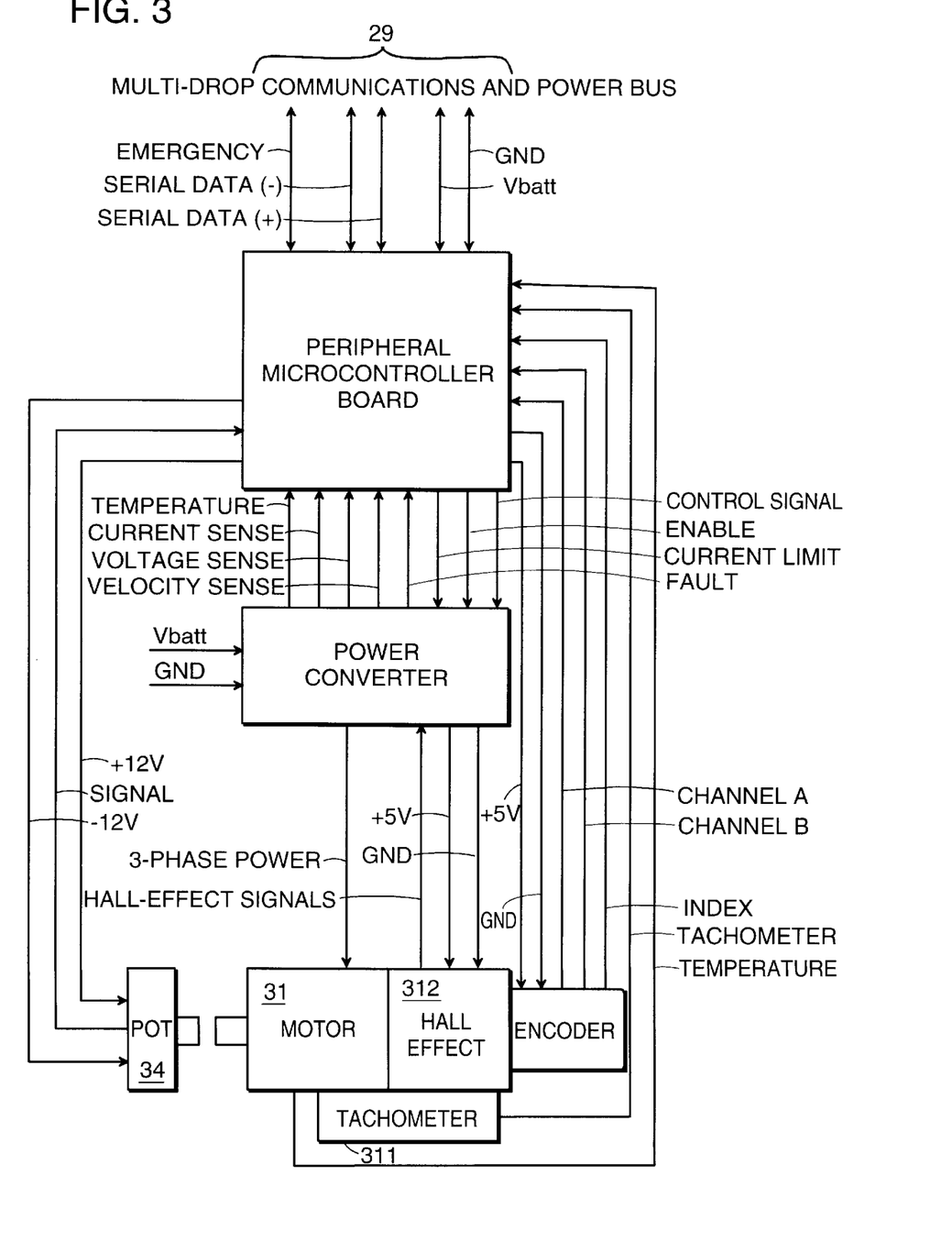
FIG. 3 is a block diagram showing the structure of a generic control assembly of the type used in the embodiment of FIG. 2.

The general structure of each of the control assemblies, identified in FIG. 2, used for the chair position and wheels and clusters is shown in FIG. 3. A motor 31 receives 3-phase power from power converter 32. Output from Hall effect detector 312 provides information signals to the power converter 32 to control the phase of power to the motor. Information signals relating to the shaft rotation of the motor or of the position of mechanical systems powered by the motor may be provided by one or more of potentiometer 34, tachometer 311, or incremental encoder 313. (Alternatively, the Hall effect detector 312 may itself be utilized.) These signals are fed to peripheral micro controller board 33. Additionally temperature outputs associated with power converter 32 and motor 31 provide input signals to the peripheral micro controller board 33. The peripheral micro controller board 33 is in turn in communication with the central micro controller board 22 over bus 29.

Figure 4:
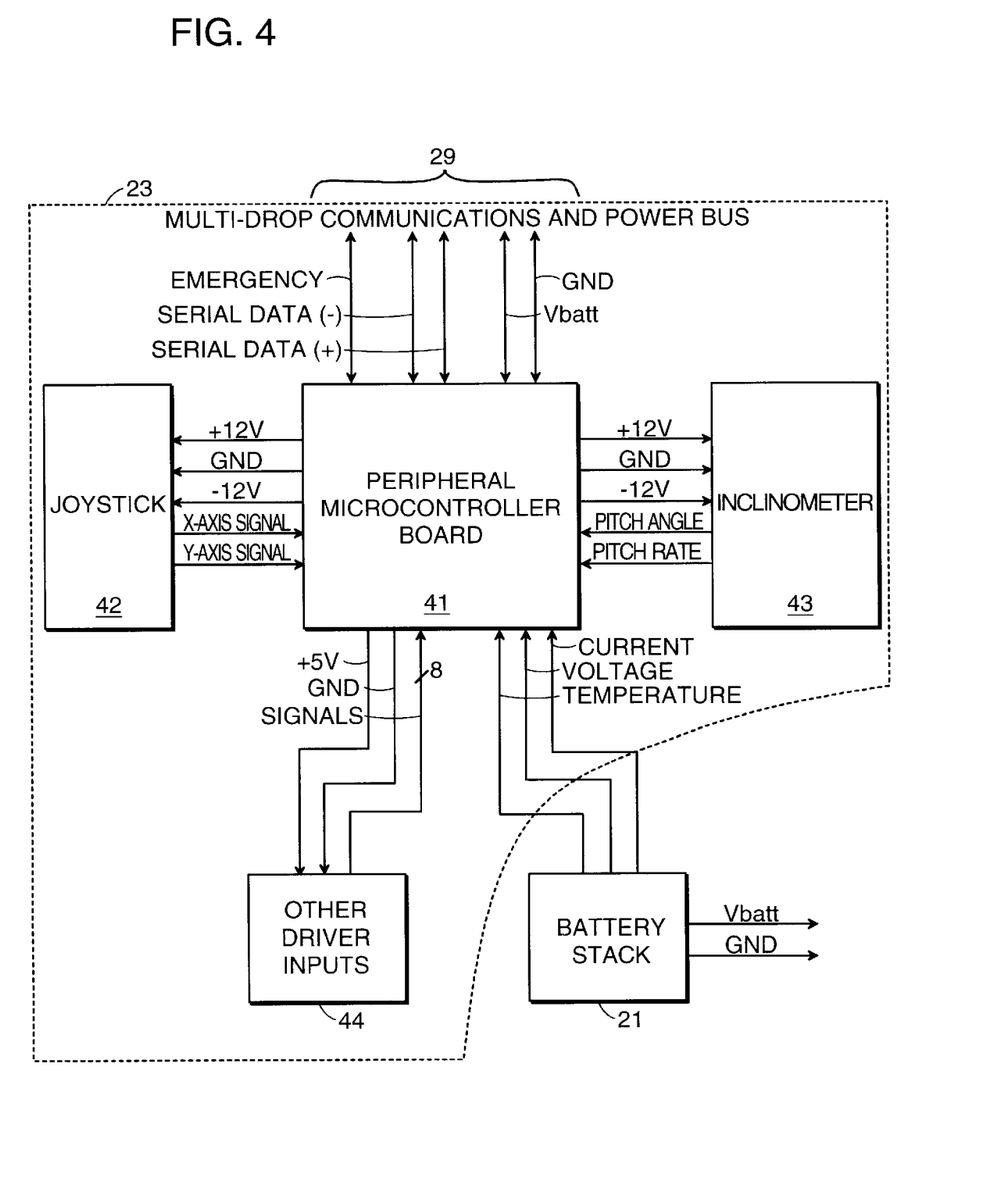
FIG. 4 is a block diagram providing detail of the driver interface assembly 23 of FIG. 2.

FIG. 4 is a block diagram providing detail of the driver interface assembly 23 of FIG. 2. A peripheral microcomputer board 41 receives an input from joystick 42 as well as from inclinometer 43. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the vehicle (thereby to increase stability while turning) it is also feasible to utilize a second inclinometer to provide information as to roll and roll rate or, alternatively, the resultant of system weight and centrifugal force. Other inputs 44 may also be desirably provided as an input to the peripheral micro controller board 41. Such other inputs may include signals gated by switches (knobs and buttons) for seat adjustment and for determining the mode of operation (such as lean mode or balance mode). The peripheral micro controller board 41 also has inputs for receiving signals from the battery stack 21 as to battery voltage, battery current, and battery temperature. The peripheral micro controller board 41 is in communication over bus 29 with the central micro controller board 22.

Figure 5:
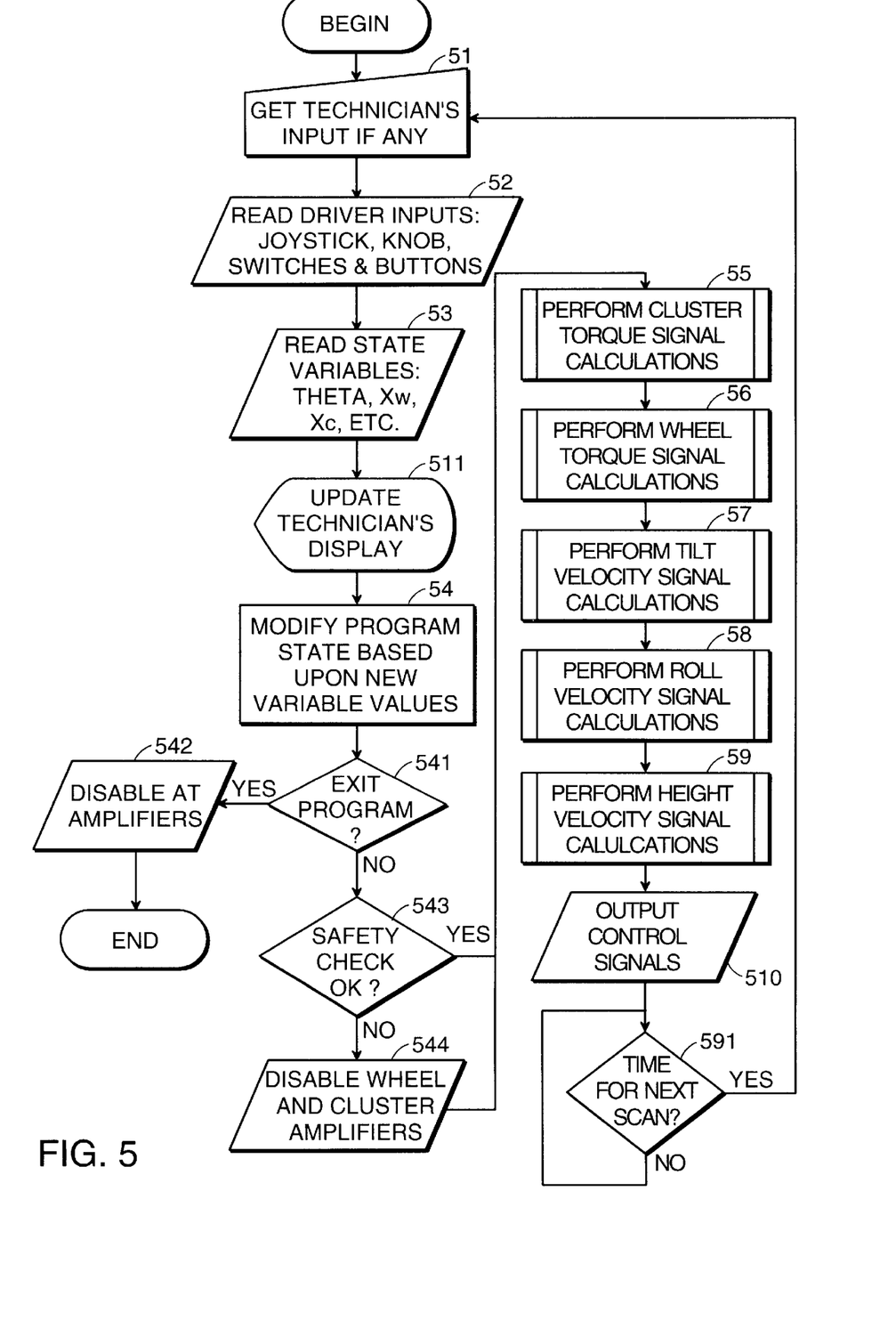
FIG. 5 is a logical flow diagram followed by the central micro controller board 22 of FIG. 2 in the course of one control cycle.

FIG. 5 is a logical flow diagram followed by the central micro controller board 22 of FIG. 2 in the course of one control cycle. For diagnostic purposes, the cycle begins at step 51, checking for the presence of any input from the technician. The next step, 52, is to read the driver's inputs from the joystick, switches, knobs, and buttons. Next, in step 53, the state variables of the vehicle are read as inputs. Next, in step 511, the technician's display is updated (in case of diagnostic use), and then, in step 54, the program state is modified based upon the input variables obtained in steps 51 through 53. A test is then made whether to exit the program (step 541), and if the determination is yes, all of the motor amplifiers are disabled (step 542), and the program is ended. Otherwise, a safety check is made (in step 543) of pertinent variables (such as temperature, battery voltage, etc., and if the result is negative, the wheel and cluster motor amplifiers are disabled (step 544), and the program state is then modified. However, several levels of checking are suitably employed so that the motor amplifiers are disabled only after threshold alarm conditioners have been established. If the safety check in step 543 is positive or after the program state is modified, calculations are performed seriatim for the cluster torque signal (step 55), wheel torque signal (step 56), tilt velocity signal (step 57), roll velocity signal (step 58), and height velocity signal (59). The results of these calculations are then provided as an output to their respective modules in step 510. Under step 591, the program waits for the next timing signal to begin the control cycle again. The frequency of the control cycles in this embodiment is in the range of 200–400 Hz., which provides satisfactory control responsiveness and stability.

Figure 6:
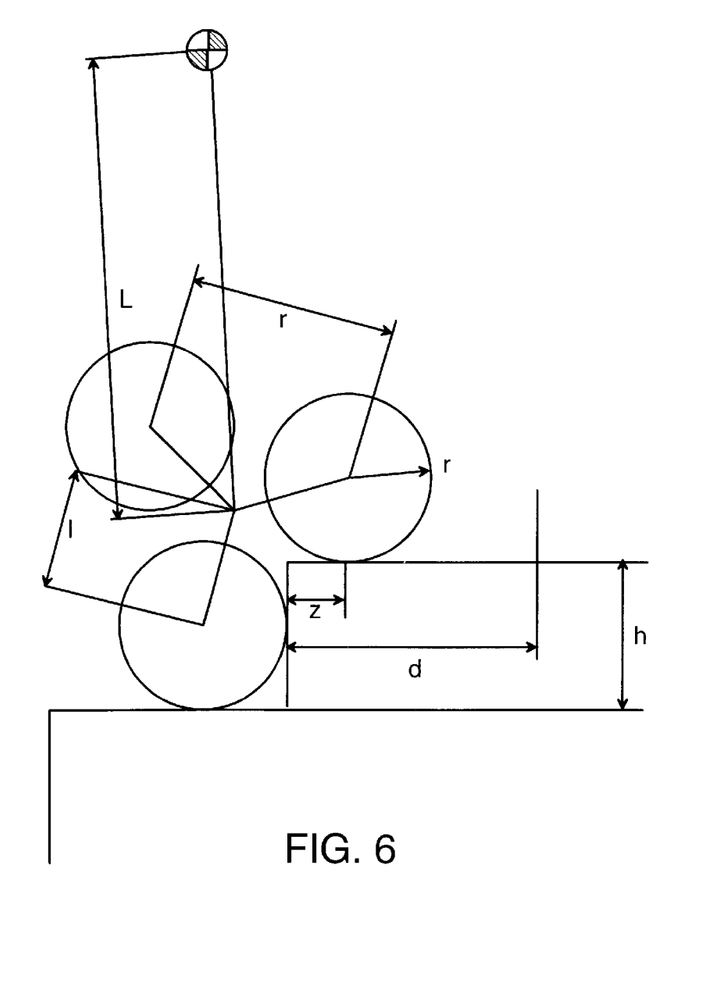
FIG. 6 illustrates variables defining the dimensions of a cluster design applicable to the controller diagrams of FIGS. 8 and 9 and of a hypothetical stair or obstacle with respect to which the cluster design may be used for ascent or descent.

FIG. 6 illustrates variables defining the dimensions of the cluster design of FIGS. 1 (but with a three-wheel cluster)

and of a hypothetical stair with respect to which the cluster design can be used for ascent or descent. Set forth in the following table are variables used to identify these dimensions shown in FIG. 6. "Nominal size" means typical dimensions of these items, in connection with which the embodiment has been implemented.

TABLE 1

Dimension Variables

| Variable | Description | Nominal Size |
|---|---|---|
| L | Distance from cluster center to center of mass of system | 21.0" |
| l | Distance from cluster center to wheel center | 5.581" |
| l' | Distance from wheel center to wheel center | 9.667" |
| d | Depth of stair | 10.9" |
| h | Height of stair | 6.85" |
| z | Distance between the edge of the riser and the wheel contact point when four wheels are in contact with the stairs and the lower wheels are against the riser. This can be calculated using $z = (l'^2 - h^2)^{1/2} - r$. | 3.011" |
| r | Radius of the wheel | 3.81" |

The following conventions have been employed in using these variables and those in Table 2 below in connection with the description below:

1. Variables defined in world coordinates are named using a single subscript in capital letters. World coordinates are coordinates fixed to the earth (inertial).
2. Variables defined in relative coordinates are named with a dual subscript. The subscripts indicate the endpoints of the variable. The order of the subscripts indicates the sign of the variable. For example, $\theta_{PC}$ is the angle between the post and the cluster leg where clockwise rotation from the cluster post is positive (see note 4). A cluster's "leg" is the line segment from the center of the cluster to the center of the wheel that is currently being balanced on. A cluster's "post" is the line segment from the system's center of mass to the center of the cluster.
3. Lower case subscripts are used to indicate other attributes, e.g., right/left, etc.: r=right; l=left; ref= reference; f=finish; s=start.
4. All angles are positive in the clockwise direction, where positive travel is in the positive x direction.
5. A dot over a variable indicates differentiation in time, e.g., $\dot{\theta}$.

Figure 7:
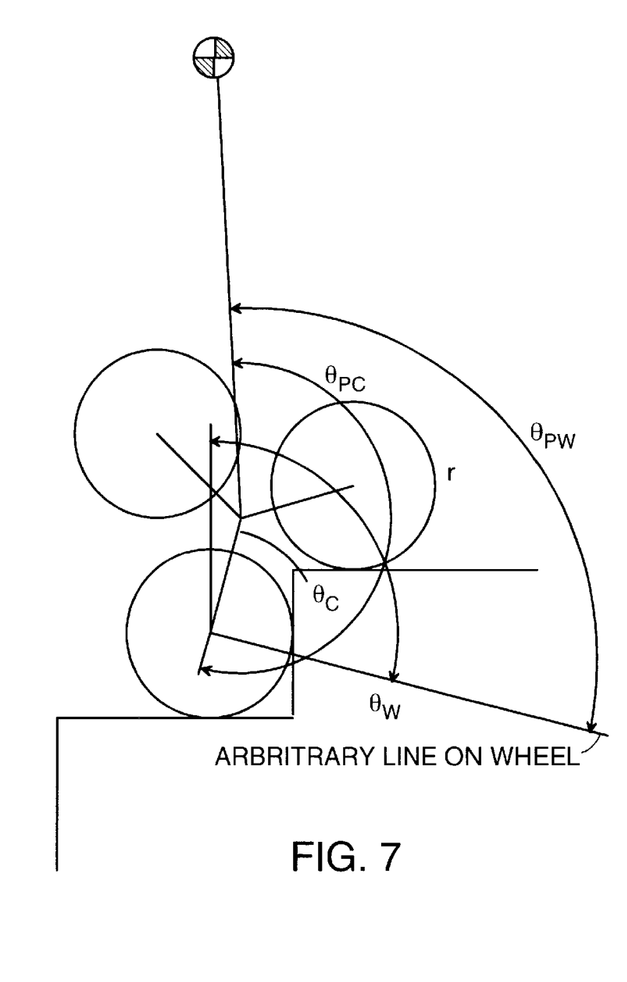
FIG. 7 illustrates angle variables pertinent to defining orientation of the cluster of FIG. 6 in relation to the vehicle and to the world.

FIG. 7 illustrates angle and motion variables pertinent to defining orientation of the cluster in relation to the vehicle and to the world. These variables are defined as set forth in the following table.

TABLE 2

Angle and Motion Variables.

| Variable | Name | Description |
|---|---|---|
| $\Theta_C$ | Theta Cluster | The angle between vertical and the line from the wheel that is currently being balanced on to the cluster hub. |
| $\Theta_W$ | Theta Wheel | The angle between vertical and an arbitrary radial line on the wheel. |
| $\Theta_{PC}$ | Theta Post-Cluster | The angle centered at the cluster hub that starts at the post and ends at the leg being balanced on. ($\Theta_{PC} = 180°$ when balanced on one wheel with the leg vertical.) |
| $\Theta_{PW}$ | Theta Post-Wheel | The angle between the post and the arbitrary line on the wheel. |
| x | x | The linear position of the wheel center along the floor in reference coordinates. |
| $\Theta_I$ | Theta Inclinometer | The angle of the inclinometer with respect to gravity. |
| $\Theta$ | Theta (Pitch Angle) | The actual angle between center of mass of the vehicle and the wheel center. This is derived by compensating inclinometer angle $\Theta_I$ for $\Theta_C$ and $\Theta_{PC}$. |
| $\psi$ | Yaw Angle | The angle between the X axis of the vehicle and the x-axis of the reference frame. |

Figure 8:
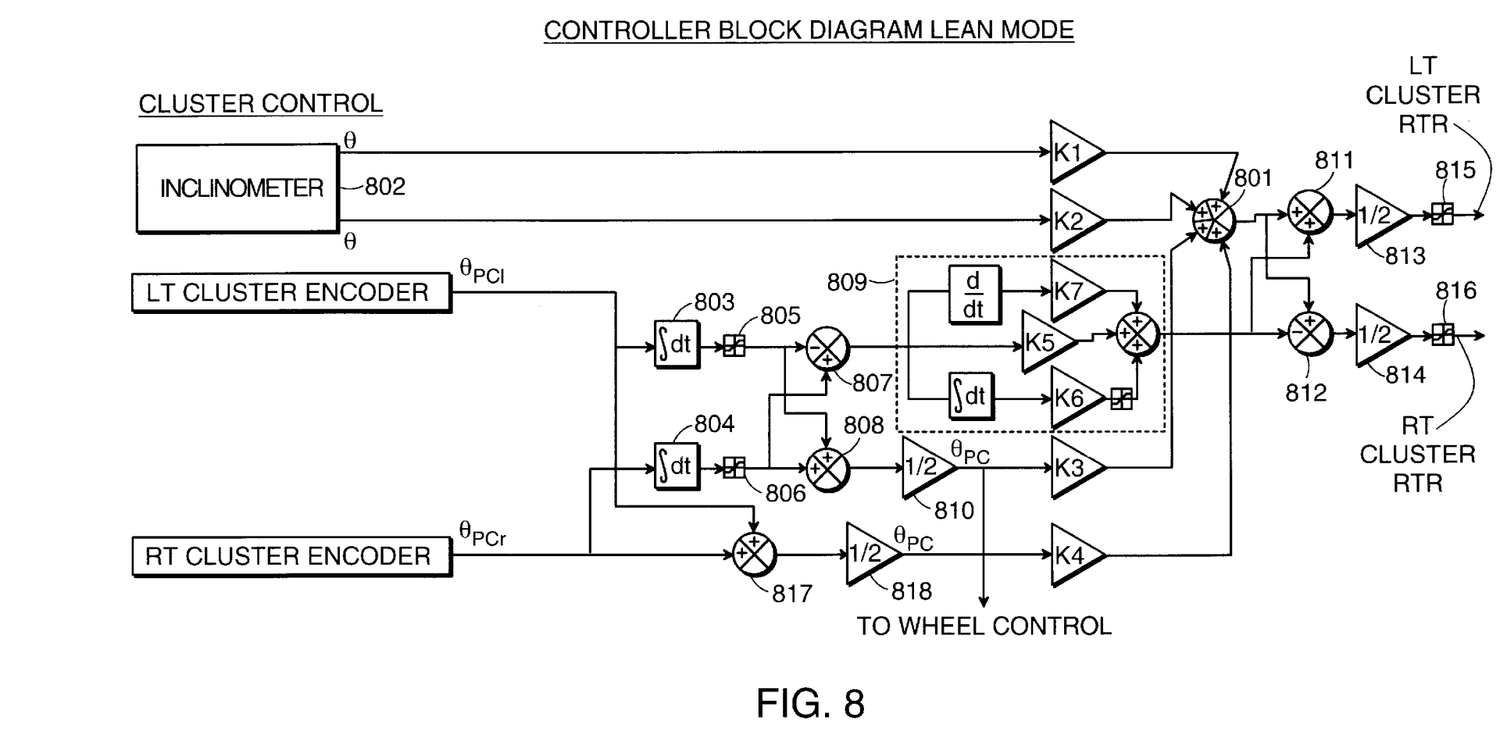
FIG. 8 is a schematic for the control arrangement for the cluster motors of a preferred embodiment permitting obstacle traversal, here employing a lean mode.
Figure 9:
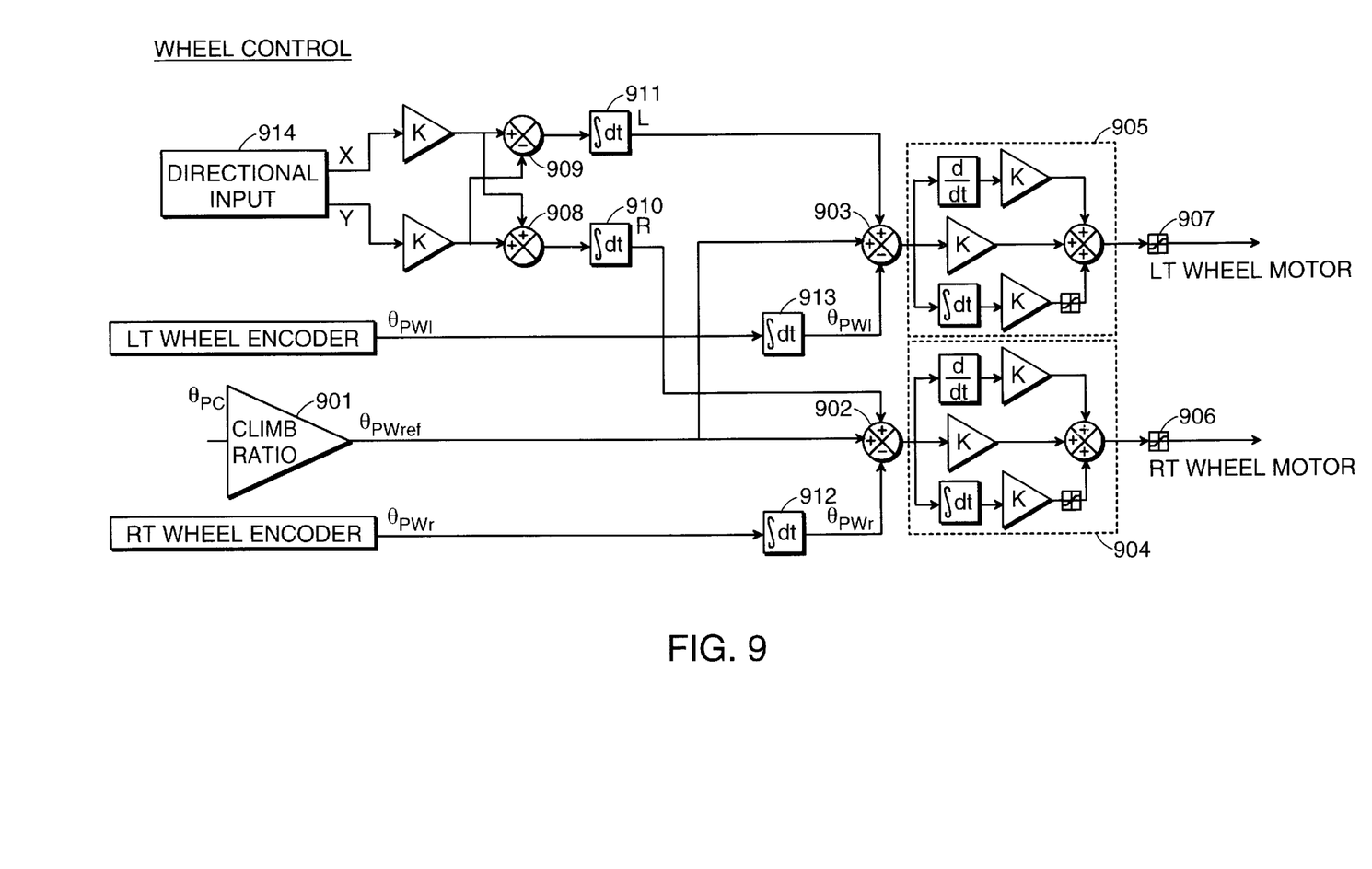
FIG. 9 is a schematic for the control arrangement for the wheel motors in the same embodiment.

FIGS. 8 and 9 illustrate the control arrangement for stair-climbing and obstacle traversal achieved by the cluster design of a preferred embodiment of the present invention. FIG. 8 is a schematic for the control arrangement for the cluster motors of a preferred embodiment permitting obstacle traversal, here employing the lean mode. In FIG. 8, summer 801 provides correction signals to drive the left and right clusters, derived, among other things, from inclinometer 802, which provides pitch and pitch rate signals $\theta$ and $\dot{\theta}$ via gains K1 and K2 respectively. The encoder outputs from left and right clusters provide inputs of $\dot{\theta}_{PCl}$ and $\dot{\theta}_{PCr}$, which are integrated by integrators 803 and 804 respectively and saturation limited by limiters 805 and 806 respectively to produce $\theta_{PCl}$ and $\theta_{PCr}$. These values, when averaged via summer 808 and divider 810, result in angular displacement $\theta_{PC}$, which is provided through gain K3 as an additional input to summer 801. The velocity $\dot{\theta}_{PC}$, determined as the average of $\dot{\theta}_{PCl}$ and $\dot{\theta}_{PCr}$, via summer 817 and divider 818, is a further input to summer 801, this time via gain K4. The output of summer 801 provides uniform drive of the left and right cluster motors via summers 811 and 812, dividers 813 and 814, and saturation limits 815 and 816 respectively. In addition, however, the twist signal, via PID control loop 809, provides a differential drive through summers 811 and 812 to the left and right cluster motors. The twist signal is derived by using summer 807 to subtract the signals $\theta_{PCl}$ and $\theta_{PCr}$ from one another.

When the clusters are in the lean mode, the wheels are in a slave mode, in which the wheels are driven as a function of the rotation of the clusters. This is shown in FIG. 9, where $\theta_{PC}$, derived from FIG. 8, as output from divider 810, is multiplied by a climb ratio constant in gain 901 to produce $\theta_{PWref}$, a signal that is fed to summers 903 and 902 to control the left and right wheel motors via PID control loops 905 and 904 and saturation limits 907 and 906 respectively. The summers 903 and 902 have two other inputs each. One input is to track the results of directional inputs 914 from the joystick, which, via summers 909 and 908 and integrators 911 and 910, produces left and right control signals provided as inputs summers 903 and 902 respectively. Another input is to track the effects of wheel rotation, so $\theta_{PWl}$ and $\theta_{PWr}$, obtained by running the left and right wheel encoder outputs through integrators 913 and 912 are also subtracted by summers 903 and 902.

The use of the lean mode provides a powerful and stable method to achieve climbing over obstacles. The climb ratio is determined by the multiplier selected for gain 901 of FIG. 9. Once this is determined (an item that can be selected manually or automatically determined following obstacle measurement using appropriate spatial sensors or determined in whole or in part empirically based on the state variables themselves) the vehicle can surmount obstacles by the subject's leaning or causing the vehicle to lean in the desired direction. The clusters rotate to maintain balance at the same time that they, with the wheels, are rotating over the obstacles.

Although when the vehicle does not encounter obstacles, it may be operated in the balance mode, as described in previous applications, with the clusters slaved to π radians and the wheels maintaining balance and causing desired locomotion, it is also possible to operate the vehicle in lean mode with four wheels in contact with the ground so as to enhance vehicle stability. In such a case, although the wheels are still be slaved to the clusters, as described in connection with FIG. 9, the directional input 914 is also effective to cause rotation of the wheels to permit travel of the vehicle. Operation in lean mode is illustrated in the figures below.

Figure 10:
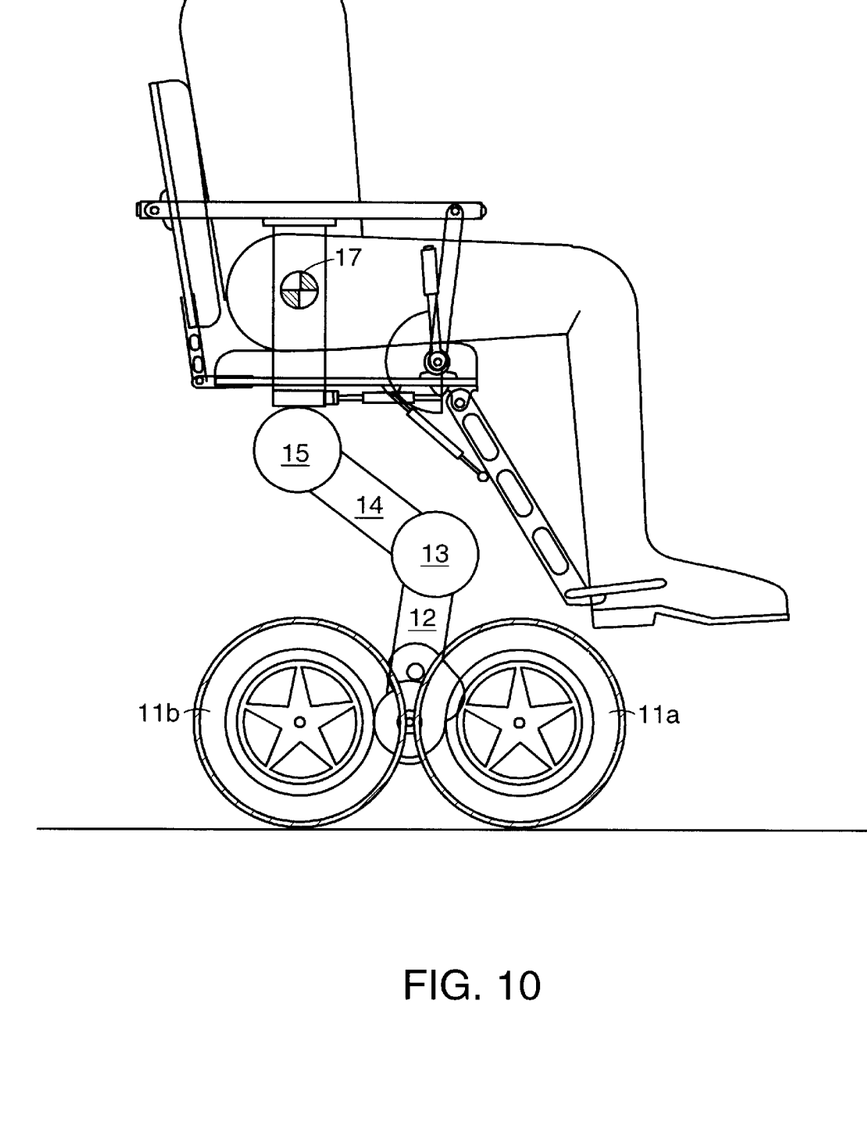
FIG. 10 shows the embodiment of FIG. 1 with the cluster motors adjusted to move the loaded vehicle's CG forward.

FIG. 10 shows the embodiment of FIG. 1 with the cluster motors adjusted to move the loaded vehicle's CG 17 backward. Note that the CG 17 is located nearly over the center of the rear wheels.

Figure 11:
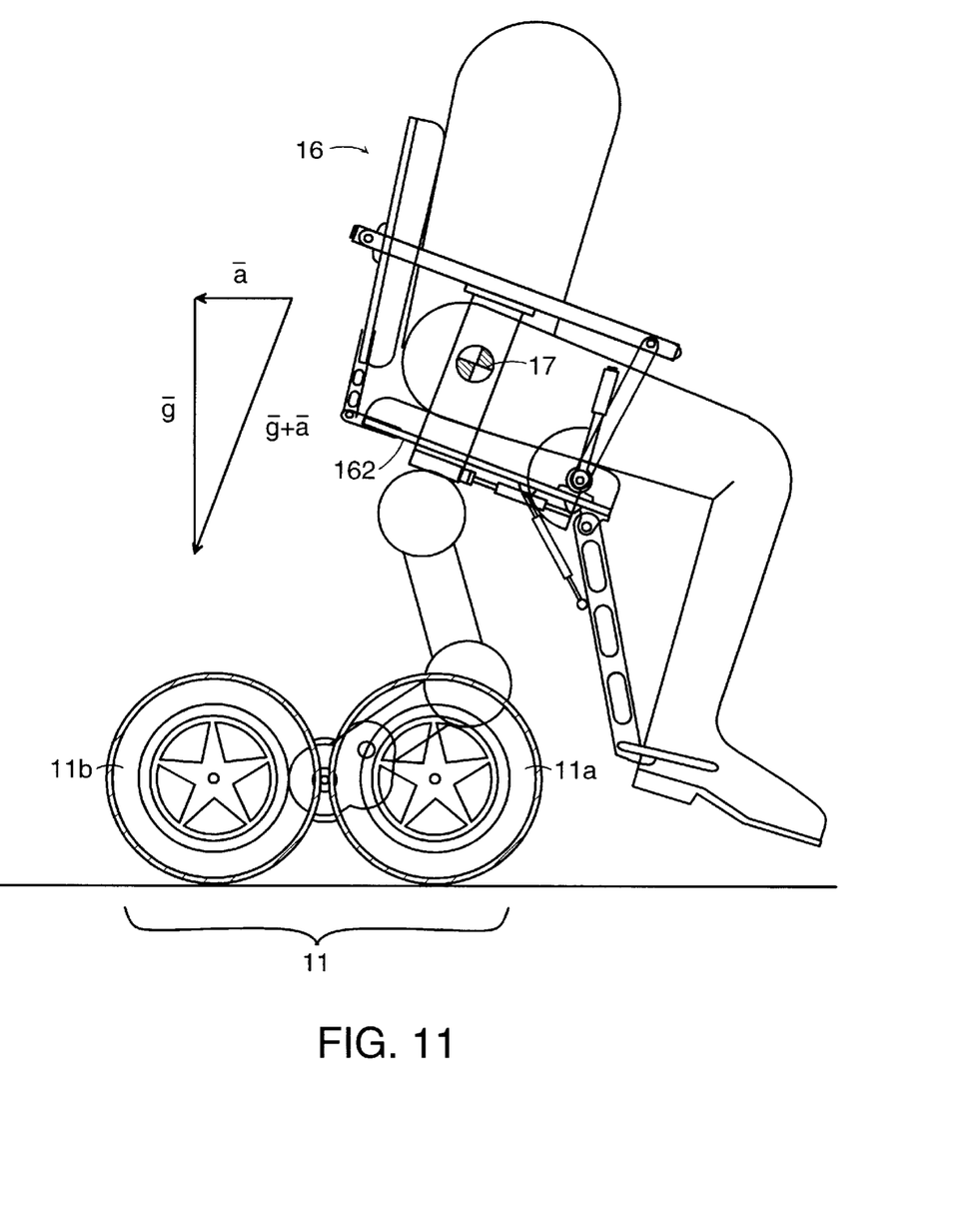
FIG. 11 shows the same embodiment with the cluster motors adjusted to place the CG farther forward and to compensate for the effects of acceleration forces attributable to gravity and vehicular movement.
Figure 12:
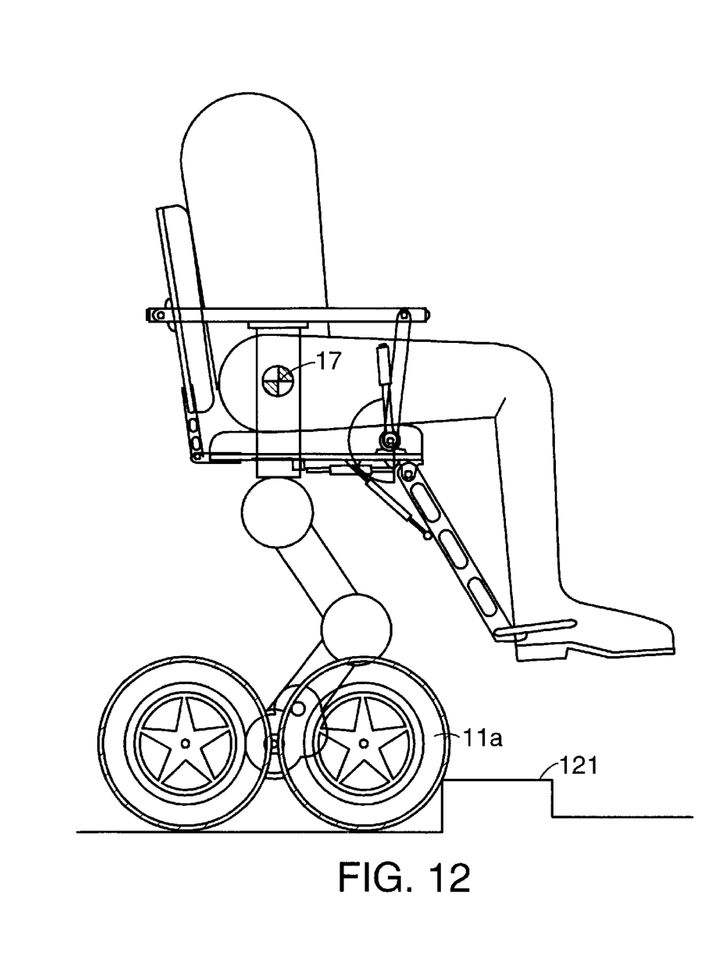
FIGS. 12–15 show movement of the embodiment's CG during obstacle traversal.
Figure 13:
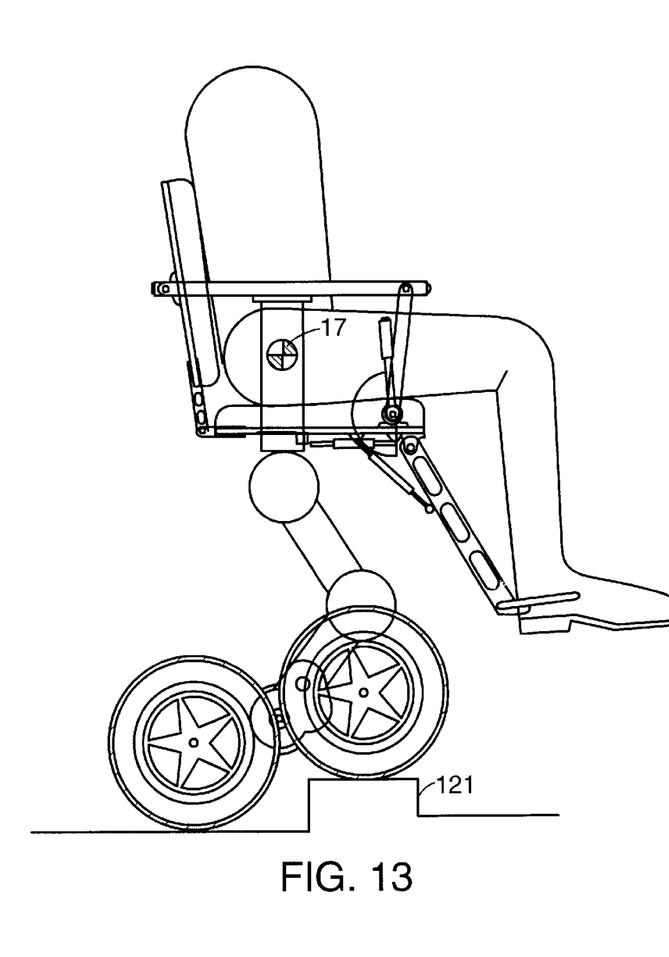

FIG. 11 shows the same embodiment with the cluster motors adjusted to place the CG 17 farther forward and to compensate for the effects of acceleration forces attributable to gravity and vehicular movement. Here the vehicle is being accelerated forward at a rate a, achieved by forces applied to the vehicle by contact of its wheels with the ground. Using Newton's second law, one can readily determine that the forces on the vehicle are, subject to a proportionality factor equal to the vehicle's mass, the vector sum of this acceleration and the acceleration vector due to gravity. This vector sum is shown in FIG. 11. However, although the gravitational force can be understood as applied at the CG 17, the force due to acceleration a is applied where the wheels are in contact with the ground. Such a force, if applied to the vehicle in the configuration of FIG. 1, would give rise to a torque in a counter-clockwise direction about the cluster center. This torque would tend to cause the vehicle to tip backwards. To counteract this torque, in FIG. 11, the chair 16 of the vehicle is moved forward of the wheels 11b and 11a, so that gravitational forces on CG 17 produce a clockwise counter torque about the cluster center. Viewed from the perspective of the subject in chair 16, the vehicle and chair 16 are oriented so that the subject feels as though the resultant force on the subject is being applied in a manner that is generally perpendicular to the seat 42 of the chair.

It should be pointed out that the orientation of the cluster 11 relative to the rest of the assembly, including chair 16 and articulated arm with segments 14 and 12, is determined by the control arrangement discussed in connection with FIG. 8. Stability enhancement comes from actively changing the cluster angle dynamically in such a way as to maximize and maintain balance in the fore-aft plane. By extension of the principles described in this application, similar stability can be achieved in the lateral plane; that is, the location of the center of gravity may be actively and dynamically shifted in a manner to increase stability in the lateral plane as well or alternatively.

Figure 14:
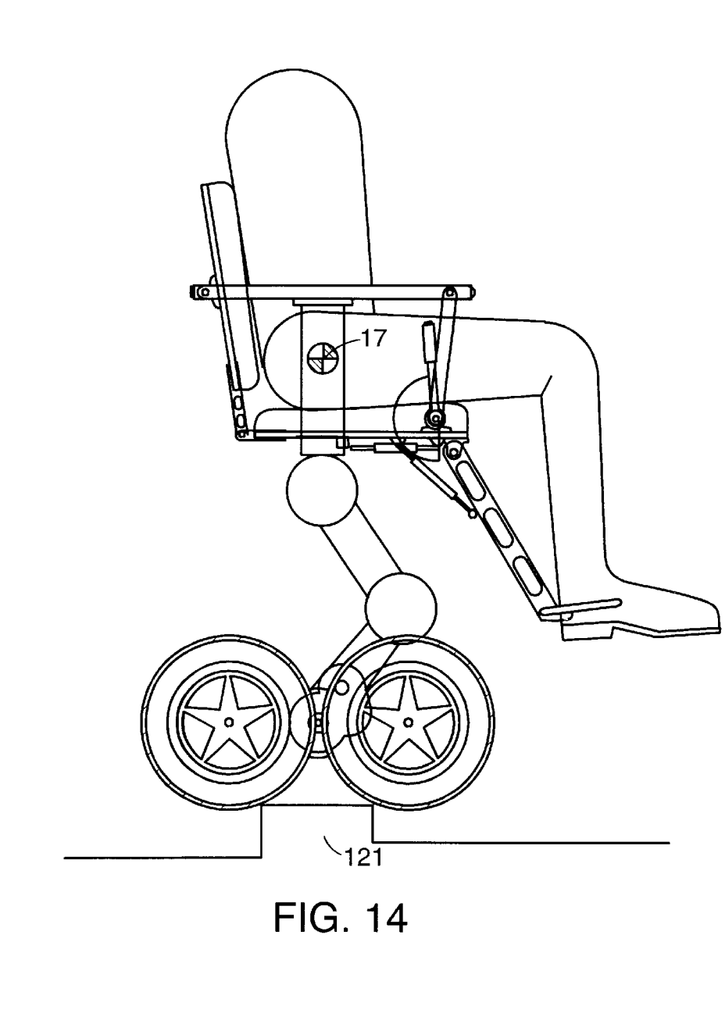
Figure 15:
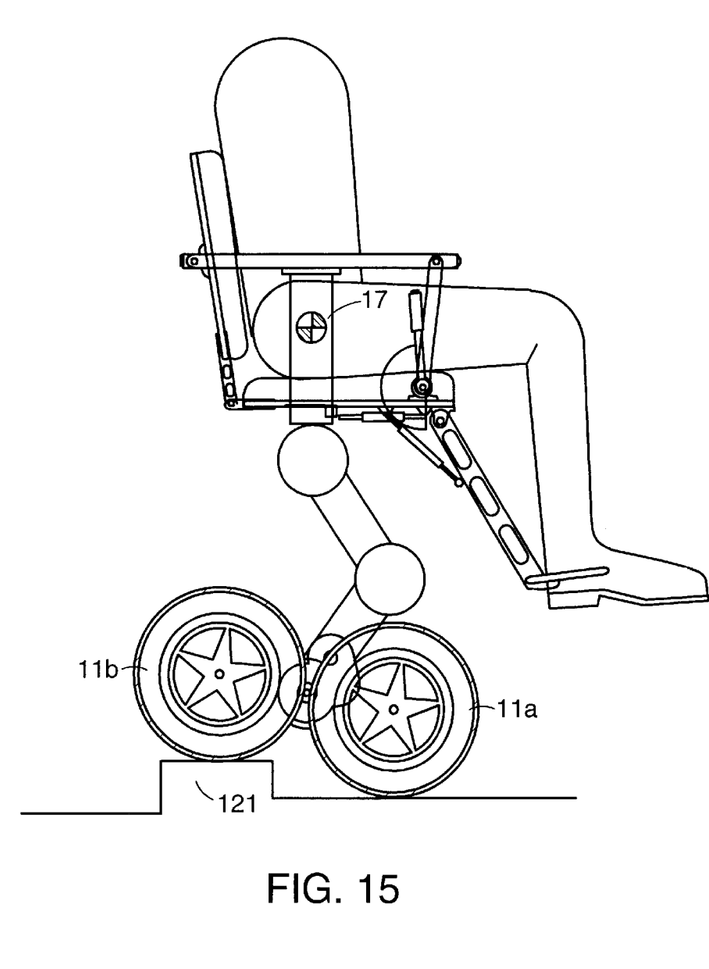

FIGS. 12–15 show movement of the embodiment's CG during obstacle traversal. Here in FIG. 12 the vehicle has encountered an obstacle 121. As the front wheel surmounts the obstacle 121 in FIG. 13, the CG 17 of the vehicle with payload is shifted forward by the control arrangement described in connection with FIG. 8. In FIG. 14, the vehicle has achieved equilibrium, and the CG 17 is in the neutral position. In FIG. 15, with the vehicle in descent from the obstacle, the CG 17 is shifted rearward.

What is claimed is:

1. A vehicle for transporting a payload over ground having a surface that may be irregular, the vehicle comprising:

(a) a support for supporting the payload;

(b) a ground-contacting module, movably attached to the support for suspending the payload in the support over the surface, the orientation of the ground-contacting module defining fore-aft and lateral planes; the support and ground-contacting module being components of an assembly; the ground-contacting module having:

(i) a module drive for moving the ground-contacting module in relation to the support; and (ii) a set of clusters of wheels, the set including exactly two clusters, each cluster having a plurality of wheels for contacting the ground, each cluster being rotatably mounted on, and motor-driven about, a laterally disposed central axis common to both clusters of the set, each of the wheels being rotatably mounted about a wheel axis, all the wheel axes being parallel to the central axis and pairwise disposed at fixed angles with respect to the central axis, the wheels capable of being motor-driven independently of either cluster, ground contact of the ground-contacting module being limited to the wheels of the clusters;

(c) a motorized drive, mounted to the assembly, for causing unassisted locomotion of the assembly and the payload over the surface;

(d) CG modifying means for actively modifying the location of the center of gravity of the assembly with payload; and (e) a CG control loop in which the CG modifying means is included for dynamically creating stability of the vehicle in the fore-aft plane by operation of the motorized drive to vary, among other things, angular orientation of the assembly in the fore-aft plane, such stability being created even while the assembly experiences varying forces and accelerations.

2. A vehicle according to claim 1, wherein each cluster has two wheels.

3. A vehicle according to claim 1, wherein each cluster has three wheels.

4. A vehicle according to claim 1, wherein the assembly includes an articulated arm having a plurality of segments linking the support to the ground-contacting module, and wherein the angle between adjacent segments is adjustable.

* * * * *